3,449,273
HOT MELT ADHESIVE
Otto Kettenring, Lunen, and Wolfgang Gotze, Bergkamen, Germany, assignors to General Mills, Inc., a corporation of Delaware
No Drawing. Filed Oct. 17, 1966, Ser. No. 586,996
Claims priority, application Germany, Nov. 23, 1965, Sch 38,073, Sch 38,074
Int. Cl. C09j 3/16; C08g 41/07
U.S. Cl. 260—18       3 Claims

ABSTRACT OF THE DISCLOSURE

There is disclosed hot melt adhesive composition comprising a polymeric fat acid polyamide and certain aromatic compounds useful for bonding sheets or films of thermoplastic materials. The aromatic compounds are certain ones containing nuclear hydroxyl groups as well as aromatic sulfonic acids, amides, chlorides and imides. The aromatic hydroxyl containing compounds are selected from the group consisting of α and β-naphthol, phenol, resorcinol, hydroquinone, pyrogallol, p-hydroxyethyl benzoate, 4,4'-dihydroxy diphenyl, and mixtures thereof.

---

This invention relates to a hot melt adhesive for bonding thermoplastics and in particular to a holt melt adhesive comprising a mixture of a polymeric fat acid polyamide and certain aromatic compounds. This mixture finds particular utility in bonding of sheets or films of thermoplastic materials.

In the past, the bonding of thermoplastic products, especially sheets or films, was carried out by the means of solvent-containing adhesives or polymerizable adhesives. With either, a certain amount of "open" time is required to permit evaporation of the solvent or to permit polymerization. Modern processes of bonding which use high-speed machines is hindered by the requirement of time and the shortest possible setting time for the adhesive joint is required and desirable. Hot melt adhesives attempted for use up to now have not proven satisfactory for the requirements of industry and are not universally useful particularly for bonding thermoplastic materials.

A hot melt adhesive for thermoplastic materials has now been discovered which comprises a mixture of (a) a polymeric fat acid polyamide and (b) certain aromatic compounds.

The polymeric fat acid polyamides suitable for this invention are commercially available products preferably having a softening point (ball and ring) of 80 to 200° C. These are well known and are prepared in the conventional manner using conventional amidification techniques. In general, this amidification is preferably conducted at temperatures of between about 180 to 280° C. condensing polymeric fat acids, or mixtures thereof, with other dicarboxylic acids, with ethylene diamine or mixture of ethylene diamine with other amine reactants, primarily other diamines.

The polymeric fat acids are obtained in the known manner by polymerization of naturally occurring fatty acids (8 to 24 carbon atoms) either mono- or polyunsaturated acids. The resultant polymerization products, which are commercially available (from $C_{10}$ acids) contain about 55 to 75% by weight of the dimeric fat acid with portions of monomeric and trimeric or higher polymeric fat acids. These can be used directly, preferably however, after having at least a portion of the monomeric fat acid removed. Through distillation, polymeric fat acids having a dimeric fat acid content of up to about 98% by weight may be obtained.

Co-dicarboxylic acid compounds usually employed in admixture with the polymeric fat acid for increasing the softening point of the polyamide are the aliphatic and aromatic dicarboxylic acids having from 6 to 12 carbon atoms and the alkyl esters thereof illustrated by the following: adipic acid, pimelic acid, suberic acid, azelaic acid, sebacic acid, nonane dicarboxylic acid, decane dicarboxylic acid, terephthalic acid, dimethyl terephthalate p-phenylenediacetic acid, dimethyl-p-phenylenediacetic acid, and p-phenylenedipropionic acid.

As indicated, the acids are reacted with ethylene diamine or mixtures thereof with other amine reactants. The preferred reactants employed in admixture with ethylene diamine are aliphatic diamines such the the diprimary diamines illustrated by tetramethylenediamine, pentamethylenediamine, hexamethylenediamine, heptamethylenediamine, octamethylenediamine, noamethylenediamin, decamethylenediamine, undecamethylenediamine, dodecamethylenediamine. In addition, aliphatic diamines carrying 1 to 3 lower alkyl substituents or a higher alkyl substituent are of importance, for example, 2,5-dimethylhexamethylenediamine, 2-methyl-4-ethylhexamethylenediamine, 2-ethyl-4-methylhexamethylenediamine, a mixture of 2,4,4-trimethylhexamethylenediamine and 2,2,4-trimethylhexamethylenediamine, a mixture of 9-aminomethylstearylamine and 10-aminomethylstearylamine.

Diamines which are interrupted by oxygen atoms in the chain (also called ether diamines) and which are also, however, suitable can be represented by the general formula:

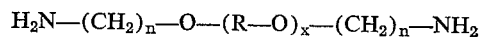

where $n$ can be a number from 3 to 5, where $x$ can have a value of 0, 1, 2, or 3, and where R is an alkyl group with a chain length of 1 to 12 carbon atoms, which may also carry alkyl substituents of 1 to 4 carbon atoms.

Examples of ether diamines of the general formula are: 1,7-diamino-4-oxoheptane, 1,11-diamino-6-oxoundecane, 1,7-diamino-3,5-dioxoheptane, 1,10-diamino-4,7-dioxoundecane, 1,10-diamino-4,7-dioxo-5-methyldecane, 1,11-diamino-4,8-dioxoundecane, 1,11-diamino-4,8-dioxo-5-ethylundecane, 1,12-diamino-4,9-dioxododecane, 1,13-diamino-4,10-dioxotridecane, 1,14-diamino-4,11-dioxotetradecane, 1,11-diamino-4,8-dioxo-5,6-dimethyl-7-propionyl undecane, 1,14-diamino-4,7,10-trioxotetradecane, 1,13-diamino-4,7,10-trioxo-5,8-dimethyltridecane, 1,20-diamino-4,17-dioxoeicosane, 1,16-diamino-4,7,10,13-tetraoxohexadecane.

Monoalkanolamines may also be employed which preferably have the general formula

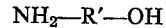

where R' is a divalent aliphatic hydrocarbon radical from 2 to 8 carbon atoms. Ethanolamine is preferred, however, further examples are: propanolamine, butanolamine, 2-amino-3-hexanol, 2-amino-4-pentanol, 5-amino-4-octanol, 3-amino-3-methyl-2-butanol and similar compounds.

The equivalents ratio between ethylenediamine and the above amine reactants used in admixture therewith should be preferably between 0.8:0.2 and 0.5:0.5.

The hot melt adhesives of the invention are suitable for bonding plastics, especially plastic sheet or films, whereby peel strength values between 0:5 and 3.0 kg./cm. are achieved depending on the plastic and the type of adhesive. Up to now such results were not possible to achieve using hot melt bonding.

The preparation of the hot melt adhesive of the invention can be effected by simply melting the polyamide preferably at about 40° C. above its softening point, adding the aromatic components of the invention to the melt and agitating vigorously until a uniform distribution has been obtained.

The processing or mixing can take place either at the time of preparation of the polyamide or at a later time, after remelting. Coating of the substrate can be accomplished by the usual processing methods, such as, for example, casting, knife-coating, or spraying from the melt and then immediately pressing on the upper part that is to be bonded, or it can be done in two working steps by additional heat sealing of the joint areas under pressure. In the latter case, hot melt adhesive of the invention can also be placed in the form of strand or film between the two parts which are to be bonded. While not preferred because of the time involved, the adhesive can be applied from solution, if desired, in which case the solvents are evaporated before the heat sealing.

The hot melt adhesives of the present invention preferably comprise a mixture of 95–70 parts by weight of the polymeric fat acid polyamide and 5–30 parts by weight of certain aromatic compounds.

These aromatic compounds are aromatic sulfonic acids, chlorides, amide or imides or aromatic compounds containing a nuclear hydroxy group. Preferably the aromatic sulfonic acid compounds are p - toluenesulfochloride, p-toluenesulfonamide, 2,4,6-trimethylbenzenesulfonamide and ditoluenesulfoimide, alkyl and cycloalkyl, o- and p-toluenesulfonamide such as N-ethyl-o- and p-toluenesulfonamide (2 carbon alkyl) and N-cyclohexyl-p-toluenesulfonamide (6 carbon cycloalkyl). The preferred aromatic compounds containing a nuclear hydroxyl group or groups are α- and β-naphthol, phenol, resorcinol, hydroquinone, pyrogallol, p-hydroxy-ethyl benzoate, and 4,4'-dihydroxydiphenyl. The aromatic compounds may be employed alone or in admixture.

Illustrative of the thermoplastic materials which may be bonded by the hot melt adhesive of this invention are acrylic resins such as polymethacrylate; polyamides or superpolyamides such as nylon; polyvinyl resins such as polyvinyl chloride and polyvinyl fluoride; cellulose acetates such as cellulose triacetate; polyesters such as the polyester resins of terephthalic acid and 1,4-cyclohexanedimethanol; polyvinylidene resins such as polyvinylidene chloride; polyolefin resins such as polyethylene and polypropylene. In the case of plasticized polyvinyl chloride, it is preferred that the aromatic compound admixed with the polymeric fat acid polyamide be an aromatic sulfonic acid compound.

The invention can best be illustrated by means of the following examples in which the polymeric fat acid employed was obtained by the polymerization of a mixture of oleic and linoleic acids (tall oil fatty acids).

EXAMPLE 1

Ninety parts of a polyamide with a softening point of 117° C., produced from 400 parts of a polymeric fat acid having a 96% dimer content, 20 parts soya fatty acid, 12 parts adipic acid, and a mixture of 29.6 parts ethylenediamine and 38.2 parts of hexamethylenediamine are melted down at about 160° C. and 10 parts of α-naphthol are uniformly stirred in. A thin polymethacrylate panel is coated with this mixture, covered with the same plastic and bonded under pressure at about 90° C. After cooling the bond is completed. The peel strength is 1.4 kg./cm. (cohesive failure). The tensile shear strength is 0.09 kg./mm.$^2$.

In the above data, as well as in all of the following examples, the composition is given in parts by weight. If not otherwise indicated, the thickness of the plastic parts or sheeting was 0.01 to 1.0 mm.

EXAMPLE 2

Eighty parts of a polyamide with a softening point of 178° C., produced from 400 parts of a polymeric fat acid having a 96% dimer content, 14 parts adipic acid, and 47.1 parts ethylenediamine are melted down at 200° C. and 20 parts of β-naphthol are uniformly stirred in. This mixture is cast on a thin polymethacrylate panel, covered with an identical panel and bonded under pressure at about 120° C. After cooling the bond is completed. The peel strength is 1.85 kg./cm. (cohesive failure). The tensile shear strength is 0.14 kg./mm.$^2$.

EXAMPLE 3

Eighty-five parts of a polyamide with a softening point of 174° C., produced from 440 parts of a polymeric fat acid having a 55% dimer content, 17 parts dimethylterephthalate, 22 parts adipic acid and a mixture of 36.5 parts ethylenediamine and 63.9 parts trimethylhexamethylenediamine are melted down at 200° C. and 15 parts of α-naphthol are uniformly stirred in. This mixture is knife-coated onto a superpolyamide (nylon) sheet, covered with an identical sheet and bonded under pressure at about 140° C. After cooling the bond is completed. The peel strength is 2.3 kg./cm. (cohesive failure). The tensile shear strength is 0.08 kg./mm.$^2$.

EXAMPLE 4

Ninety parts of a polyamide of Example 3 are melted down at 200° C. and 10 parts of α-naphthol are uniformly stirred in. This mixture is cast on a hard polyvinyl chloride film, covered with an identical film and bonded under pressure at about 140° C. After cooling the bond is completed. The peel strength is 3.4 kg./cm. The tensile shear strength is 0.12 kg./mm.$^2$.

EXAMPLE 5

Ninety parts of a polyamide with a softening point of 115° C., produced from 383.6 parts of a polymeric fat acid having a 75% dimer content, 16.4 parts soya fatty acid and 10.0 parts adipic acid and a mixture of 48.7 parts trimethylhexamethylenediamine and 27.8 parts ethylenediamine are melted down at about 160° C. and 10 parts of α-naphthol are uniformly stirred in. This mixture is cast on a polyvinyl fluoride film, covered with an identical film and bonded under pressure at about 90° C. After cooling the bond is completed. The peel strength is 4.2 kg./cm. The tensile shear strentgh is 0.13 kg./mm.$^2$.

EXAMPLE 6

Eighty-five parts of a polyamide of Example 5 are melted down at about 160° C. and 15 parts of α-naphthol are uniformly stirred in. The mixture is coated on a cellulose triacetate film, covered with an identical film and bonded under pressure at about 90° C. After cooling the bond is completed. The peel strength is 3.3 kg./cm. The tensile shear strength is 0.09 kg./mm.$^2$.

EXAMPLE 7

Same procedure is used as in Example 5 the difference being that instead of the polyvinyl fluoride film, a film of a polyester based on terephthalic acid and 1,4-cyclohexanedimethanol is used. The peel strength is 3.6 kg./cm. The tensile shear strength is 0.1 kg./mm.$^2$.

EXAMPLE 8

Same procedure is used as in Example 5 the difference being that an untreated polypropylene film is used instead of a polyvinyl fluoride film. The peel strength is 2.0 kg./cm. The tensile shear strength is 0.08 kg./mm.$^2$.

EXAMPLE 9

Same procedure is used as in Example 4 the difference being that a polyvinylidene chloride film is used instead of the hard polyvinyl chloride film. The peel strength is 3.15 kg./cm. The tensile shear strength is 0.17 kg./mm.$^2$.

EXAMPLE 10

Ninety-five parts of a polyamide with a softening point of 113° C., produced from 400 parts of a polymeric fat acid having a 96% dimer content, and 40.5 parts ethylenediamine are melted down at about 150° C. and 5 parts of p-hydroxyethyl benzoate are uniformly stirred in. This mixture is applied on a treated polyethylene film, covered with an identical film and bonded under pressure at about 100° C. After cooling the bond is complete. The peel strength is 0.6 kg./cm. The tensile shear strength is 0.22 kg./mm.²

EXAMPLE 11

Ninety parts of a polyamide with a softening point of 173° C., produced from 400 parts of a polymeric fat acid having a 96% dimer content, 16 parts soya fatty acid and 52 parts adipic acid and a mixture of 50.75 parts hexamethylenediamine and 39.5 parts ethylenediamine are melted down at about 210° C. and 10 parts of p-toluenesulfonamide are uniformly stirred in. This molten mixture is applied on polymethacrylate (Plexiglas), covered with the same plastic and bonded under pressure at about 140° C. After cooling the bond is completed. The peel strength is 2.2 kg./cm. (cohesive failure). The tensile shear strength is 0.15 kg./mm.²

EXAMPLE 12

Eighty parts of a polyamide with a softening point of 174° C., produced from 440 parts of a polymeric fat acid having a 55% dimer content, 17 parts dimethylterephthalate, 22 parts adipic acid and a mixture of 36.5 parts ethylenediamine and 63.9 parts trimethylhexamethylenediamine are melted down at about 210° C. and 20 parts of a mixture of o- and p-toluenesulfonamide are uniformly stirred in. This mixture is applied on polymethacrylate, covered with the same plastic and bonded under pressure at about 110° C. After cooling the bond is completed. The peel strength is 1.6 kg./cm. (cohesive failure). The tensile shear strength is 0.12 kg./mm.²

EXAMPLE 13

Ninety-five parts of a polyamide with a softening point of 113° C., produced from 400 parts of a polymeric fat acid having a 96% dimer content and 40.5 parts ethylenediamine are melted down at about 150° C. and 5 parts of a mixture of o- and p-toluenesulfonamide are uniformly stirred in. This mixture is applied on a polyvinyl fluoride film, covered with an identical film and bonded under pressure at 100° C. After cooling the bond is completed. The peel strength is 0.8 kg./cm. The tensile shear strength is 0.25 kg./mm.²

EXAMPLE 14

Ninety-five parts of a polyamide with a softening point of 115° C., produced from 383.6 parts of a polymeric fat acid having a 75% dimer content, 16.4 parts soya fatty acid and 10.0 parts adipic acid and a mixture of 48.7 parts of trimethylhexamethylenediamine and 27.8 parts ethylenediamine are melted down at about 160° C. and 5 parts of p-toluenesulfonamide are uniformly stirred in. This mixture is applied on a treated polyethylene film, covered with an identical film and bonded under pressure at about 100° C. After cooling the bond is completed. The peel strength is 0.5 kg./cm. The tensile shear strength is 0.21 kg./mm.²

EXAMPLE 15

Ninety parts of a polyamide with a softening point of 117° C., produced from 400 parts of a polymeric fat acid having a 96% dimer content, 20 parts soya fatty acid, 12 parts adipic acid and a mixture of 29.6 parts ethylenediamine and 38.2 parts hexamethylenediamine are melted down at about 160° C. and 10 parts of N-cyclohexyl-p-toluenesulfonamide are uniformly stirred in. This mixture is applied on polymethacrylate, covered with the same plastic and bonded under pressure at about 90° C. After cooling the bond is completed. The peel strength is 2.1 kg./cm. (cohesive failure). The tensile shear strength is 0.1 kg./mm.²

EXAMPLE 16

Same procedure is used as in Example 15 except that N-ethyl-o- and p-toluenesulfonamide is used instead of N-cyclohexyl-p-toluenesulfonamide. The peel strength is 2.5 kg./cm. (cohesive failure). The tensile shear strength is 0.1 kg./mm.²

The embodiments of the invention in which an exclusive property or privilege is claimed are defined as follows:

1. A hot melt adhesive composition comprising a mixture of from 95 to 70 parts by weight of a polymeric fat acid polyamide having a softening point of 80–200° C. and from 5 to 30 parts by weight of an aromatic compound selected from the group consisting of α- and β-naphthol, phenol, resorcinol, hydroquinone, pyrogallol, p-hydroxy-ethyl benzoate, 4,4′-dihydroxydiphenyl and mixtures thereof.

2. A hot melt adhesive as defined in claim 1 in which said polymeric fat acid polyamide comprises the amplification product of ethylenediamine and polymerized tall oil fatty acids.

3. A hot melt adhesive as defined in claim 1 in which said polymeric fat acid polyamide comprises the amidification product of a mixture of ethylenediamine with an amine coreactant selected from the group consisting of
   (a) aliphatic diprimary diamines having from 3 to 20 carbon atoms
   (b) ether diamines of the formula $$H_2N—(CH_2)_n—O—(R—O)_x—(CH_2)_n—NH_2$$

where $n$ is an integer from 3 to 5 and $x$ is an integer from 0 to 3 and R is an alkyl group having from 1 to 12 carbon atoms and
   (c) monoalkanolamines of the formula $$NH_2—R'—OH$$

where R′ is a divalent aliphatic hydrocarbon radical having from 2 to 8 carbon atoms
with a mixture of polymerized tall oil fatty acids and a dicarboxylic coreactant selected from the group consisting of aromatic and aliphatic hydrocarbon dicarboxylic acids having from 6 to 12 carbon atoms and the alkyl esters thereof in which the alkyl group has from 1 to 4 carbon atoms.

References Cited

UNITED STATES PATENTS

| | | | |
|---|---|---|---|
| 3,268,461 | 8/1966 | Jacobson | 260—18 |
| 2,653,880 | 9/1953 | Hendricks | 260— 18 X |
| 2,214,402 | 9/1940 | Carothers | 260—33.4 X |

OTHER REFERENCES

"Technical Bulletin II–B," General Mills, 1955, pp. 1 and 5.

"Versamid Technical Bulletin II–A," General Mills, 1955, pp. 8 and 9.

"Technical Bulletin Number 412B," Emery Industries, 1967, p. 12.

Handbook of Adhesives, Skeist, Reinhold, N.Y., 1962, pp. 457, 458, 559.

HOSEA E. TAYLOR, JR., *Primary Examiner.*

C. W. IVY, *Assistant Examiner.*

U.S. Cl. X.R.

106—287; 156—331; 260—30.8, 31.2 33.4; 161—189, 227, 228

PO-1050
(5/69)

UNITED STATES PATENT OFFICE
CERTIFICATE OF CORRECTION

Patent No. 3,449,273      Dated June 10, 1969

Inventor(s) Otto Kettenring and Wolfgang Gotze

It is certified that error appears in the above-identified patent and that said Letters Patent are hereby corrected as shown below:

Column 1, line 28, delete "holt" and insert -- hot --.

Column 2, lines 39 and 40, delete "dioxoundecane" and insert -- dioxodecane --.

Column 2, line 62, delete "0:5" and insert -- 0.5 --.

Column 6, lines 19 and 20, delete "amplification" and insert -- amidification --.

SIGNED AND
SEALED
MAR 17 1970

(SEAL)
Attest:

Edward M. Fletcher, Jr.
Attesting Officer

WILLIAM E. SCHUYLER, JR.
Commissioner of Patents